United States Patent Office

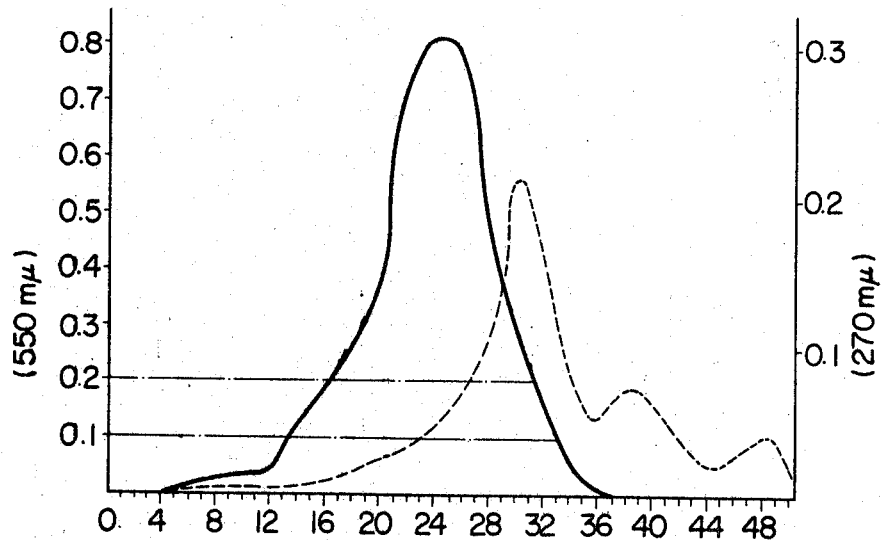

3,498,964
Patented Mar. 3, 1970

3,498,964
PERIPHERAL VASODILATOR PEPTIDE OBTAINED FROM THE ANIMALS OF THE FAMILY OTARIIDAE AND METHOD OF PREPARING THE SAME
Takashi Hayashi, 5–2537 Kamimeguro, Meguro-ku; Taneko Suzuki, 1–119 Kashiwagi, Shinjuku-ku; and Shoji Nishiwaki, 17 Ichigaya Kawada-cho, Shinjuku-ku, all of Tokyo, Japan; and Tosiro Otsuka, Danchi 2-25-203, 7-17 Tokiwadaira, Matsudo-shi, Chiba-ken, Japan
Filed Aug. 29, 1966, Ser. No. 575,812
Claims priority, application Japan, Aug. 30, 1965, 40/52,500; Mar. 30, 1966, 41/19,214; Aug. 8, 1966, 41/51,670; Aug. 10, 1966, 41/52,073; Aug. 16, 1966, 41/53,422; Aug. 17, 1966, 41/53,673; Aug. 18, 1966, 41/53,913, 41/53,914, 41/53,915
Int. Cl. C07g 7/00; A61k 9/02, 27/00
U.S. Cl. 260—112
12 Claims

ABSTRACT OF THE DISCLOSURE

A process for preparing a peptide type peripheral vasodilatation substance comprising subjecting the skeletal muscles or viscera of an animal of the Otariidae family to hydrolysis and thereafter extracting the liquor resulting from such hydrolysis with a water-containing organic solvent or salting out the liquor with ammonium sulfate. Such hydrolysis is conducted in the presence of at least one substance selected from proteases, autolytic enzymes, and hydrolytic acids and alkali. The peptic type substance produced shows a positive biuret reaction and demonstrates an activity of enhancing the evoked potential of the cerebral cortex when administered into the blood stream by intravenous injection.

---

This invention relates to a method of preparation as well as utilization of a new, hitherto unreported, peptide type substance having the function of peripheral vasodilatation, which has been obtained from the animals of the family Otariidae and particularly from the skeletal muscles and/or viscera thereof. The aquatic animals of the family Otariidae prefer to inhabit the cold water region and differ in many respects from those animals which habitually reside in the temperate and tropical regions. For instance, their powerful body temperature maintaining ability can be conceived as not being merely due to the development of their hypodermal fat layer but to the possession of a special substance of some sort. We studied the tissues of these animals from the foregoing viewpoint, and as a result succeeded in obtaining a pharmacologically effective substance therefrom.

The peripheral vasodilator substance of this invention is obtained from the animals of the family Otariidae, and particularly from the skeletal muscles and viscera thereof and, as hereinafter fully described, is a peptide type substance having a pharmacologically effectve peripheral vasodilator activity to man and mammals, it being a biuret reaction positive substance. This substance not only is valuable as a mild depressant for hypertension, but also utilizing the aforesaid function of peripheral vasodilatation it is useful as an adjuvant to be used for blending with various medicaments, beauty creams and lip rouges, etc., and as additives to be incorporated in medicated wines and other foodstuffs as well as chewing gum and other luxury items.

It is therefore an object of this invention to provide a heretofore unknown pharmacologically effective peptide type peripheral vasodilator substance possessed by the animals of the family Otariidae.

Another object is to provide a method of preparing this substance from the tissues of the animals of the family Otariidae.

Other objects and advantages of this invention will be apparent from the following description.

The new peptide type peripheral vasodilator substance is collected from the aquatic animals belonging to the family Otariidae, and particularly from at least one of either the skeletal muscles or viscera or said animals. It was not known at all heretofore that these animals had such a pharmacologically effective peptide type substance.

As the animals that can be used as the raw material, fur seal (*Callotaria ursina*) is most advantageous from the commercial standpoint, but the other animals such, for example, as Stellar's sea lion (*Eumetotias jubata*) and southern fur seal (*Arctocephalus pusillus* and *Arctocephalus stp*) can also be used.

According to our studies, this peptide type peripheral vasodilator substance is obtained from only the skeletal and visceral muscles of the aforesaid aquatic animals of the family Otariidae, it being impossible to obtain this substance in an appreciable amount from the other parts of these animals.

As substances which have collected heretofore from animals and known to have the function of vasodilatation, typical are kallidin 9 (Bradykinin) and kallidin 10.

The former is the oligopeptide which is formed during active secretion in sweat glands, salivary glands and exocrine portion of the pancreas and greatly increases the blood flow in these secreting tissues. These kinins are found in wasp and other insect venoms; they are not normally present in blood but can be released in vivo.

Normally, the enzyme named kallikrein circulates in the form of its inactive precursor. When it is activated, it catalyzes the formations from a circulating $A_2$-globulin kallidin 10 and aminopeptidase converts it to kallidin 9 (Bradykinin). The primary chemical structure of both kallidins are known. These hithertoknown peptides are metabolites in vivo, but the invention peptide, as shown in later section is not a metabolite, it is an artificially extracted peptide by a certain procedure from skeletal muscles and viscera of special marine mammals.

As compared with these peptides, the invention peptide obtained from the aquatic animals of the family Otariidae can be differentiated therefrom in respect of the following points.

(1) The invention substance, when injected intravenously, causes an increase in the evoked potential in the cerebral cortex, whereas bradykinine and kallidin do not demonstrate this change in the evoked potential.

(2) The invention substance is pronounced in its function of dilating the blood vessels of the cerebral cortex and the peripheral arteries of other parts, but bradykinine and kallidin 10 sets up the dilatation of the arteries and capillaries rather as a secondary action of the contraction of the veins.

(3) The blood pressure depressant action of the invention substance is very mild. It being a lowering of about 10–20 mm. Hg in the carotid arteries of mammals, a desirable depressant action is demonstrated. On the other hand, since a precipitous decline occurs in the case of the aforementioned known substances, they are undesirable from the physiological standpoint.

Further, the peptide type peripheral vasodilator substance of this invention, as compared with the conventional peptides obtained from animal sources and having the function of peripheral vasodilatation, excels in the following respects as regards its pharmacological actions and toxicity.

(1) The peripheral vasodilation of the invention substance does not become intense upon being administered in a large dosage, since the physiological action demonstrated is held within certain limits even though the dosage administered is large.

(2) Although the other substances cause respectively either a dilative or constrictive action to take place in the artery, vein and capillaries, the invention substance chiefly sets up the dilatation of that part at the terminus of the branches of the capillaries.

(3) The invention substance does not cause a dramatic decline in the blood pressure but demonstrates a gradual decrease thereof. Moreover, a precipitous depressant action is not demonstrated even though it is administered in large dosages.

The details of the structure of the invention peptide type vasodilator substance are not fully known as yet, but it is a peptide type substance of relatively low molecular weight not containing substantially any high molecular weight proteolytic substances, i.e., the primary converted proteins. Its crude product has the following physical and chemical properties:

Solubility

Soluble at room temperature in water and water-containing ethanol (not more than 80% ethanol).

Soluble at room temperature in methanol, butanol and acetone (containing in all cases at least 20% of water).

Insoluble in alcohols and acetone of above 80% concentration.

Biuret reaction

The biuret reaction to be hereinafter defined is positive. The maximum absorption of the color resulting from the biruret reaction is at 550 m$\mu$. In this connection that in the case of native peptide is 545 m$\mu$.

Estimation of molecular weight

A cellophane tube is filled with 100 cc. of a water-containing alcohol solution containing about 10 mg. of peptide per 1 cc. of the solution, following which dialysis is carried out with water for 24 hours at 2° C. From the fact that the inside liquid of the dialysis, when tested for its physiological activity, had lost its activity, it is not conceivable that said peptide is a polypeptide having 10 or more amino acids linked thereto. That it is biuret reaction positive indicates that it is tripeptide or greater. An aqueous solution containing about 8 mg. of peptide per 1 cc. of the solution is ultracentrifuged at 60,000 r.p.m. for one hour. When the resulting Schlieren pattern is observed, the sedimentation constant in terms of Swedberg units is estimated as being $S_{20}$ (sedimentation constant at 20° C.) of not more than 1.0, and hence it is estimated that the molecular weight is not greater than 10,000.

Tyrosine residue

The optical density at 220–230 m$\mu$ at which is seen the absorption of the tyrosine residue of a 0.005±0.001% by weight aqueous solution of the invention substance is substantially zero.

Amino acids

When the invention substance is tested with the amino acid automatic analyzer, the amount of free amino acids is very slight, and the number of unknown peaks which develop color by reacting with ninhydrine (Aberderhalden-Schmidt reaction) are observed to be 10–12 or even more. When the invention substance is subjected to hydrolysis and then again tested with the amino acid automatic analyzer, these peaks disappear and practically all classes of amino acids appear.

According to our experiments, when an aqueous solution of a crude product of the invention substance (4.5 mg. per 1 cc. of the solution as peptide type N) is administered by intravenous injection to dogs or cats at a dosage of 0.4 ml. per kg. of the weight of said dogs or cats, (1) The evoked potential of the cerebral cortex cells increases. This signifies that the cortex cell function has increased its activity. There has been known no substance in the past which manifests such an action.

(2) No change from the normal state occurs in the evoked potential of the thalamus cells.

From the results of (1) and (2), it is considered that this substance has the action of enhancing the activity of the cortex cell itself besides its function of vasodilatation.

(3) The dilatation of the surface blood vessels of the cerebral cortex which can be observed by the method of opening the skull was also observable with the naked eye.

This result agrees with the experimental results of (1) and (2), above.

(4) Further, when examination was made by the abdominal window method using a rabbit, a dilatation of the visceral capillaries of the rabbit was noted.

From the results of (3) and (4), it can be seen that there is present in the invention substance obtained from the aquatic animals of the family Otariidae a substance which has the function of dilating the capillaries.

(5) Further, according to measurements of the blood pressure of the carotid artery of rabbits (normal: 150 mm. Hg), a decrease in the blood pressure of 10–20 mm. Hg was noted by the injection of a solution of this substance. This is a phenomenon which agrees with the hereinabove described function of vasodilation of the capillaries.

(6) As another experiment, a solution of the invention substance was brushed on the skin of the breast of rabbits and observations of the surface blood vessels was made by the abdominal window method. A vasodilatation action, as hereinbefore described, was observed. It was found however that this response was not due to the response of the skin blood vessels but was due to the absorption of the effective substance from the skin.

(7) In order to determine whether this new peptide type peripheral vasodilator substance was present in other mammals experiments were conducted on extracts prepared by the same method as used in preparing the aforesaid invention substance, using as the material animals dog, cat, cow, hog, whale, common seal and dolphin, but the presence of an active ingredient having the hereinbefore described properties could not be found. This result should be sufficient to assume that the peptide type peripheral vasodilatational substance of this invention is a substance which is singularly possessed by the aquatic animals of the family Otariidae.

Next, in an in vivo experiment wherein the invention peptide type peripheral vasodilatational substance was administered orally, the following results were reported in the case of 70–75% of the 50 persons tested. (1) No unpleasantness or unusual side effects. (2) Subjectively, felt comfortable and slept well. (3) Objectively, the complexion showed an improvement and generally the texture of the skin became smoother.

Again, when the invention substance was incorporated in a beauty cream and this was applied once daily to the face, hands and limbs, it was reported that there was subjectively a feeling of well-being and objectively an improvement in the hue and tone of the face, hands and limbs. Since the histamine content of the crude product of the invention substance is on the order of 1.6–2.0 $\mu$g./ml. and that of the purified product is substantially zero, the aforesaid results are unrelated to the histamine content.

Further, even though the invention substance was administered orally to animals, say, dogs and cats, in a dosage up to 100 times the effective amount, it was far below the lethal dosage.

The new peptide type peripheral vasodilator substance obtained from at least one of either the skeletal muscles or viscera of the animals of the family Otariidae, as hereinbefore described, is a biuret reaction positive substance according to the definition to be given hereinafter in connection with its method of preparation. Therefore, the invention substance can be termed as being a peptide type peripheral vasodilator substance which is collected from at least one of either the skeletal muscles or viscera of the animals of the family Otariidae, is biuret reaction positive as defined herein and has the function of peripheral vasodilatation whereby an enhancement in the evoked potential of the cerebral cortex cells is demonstrated when it is administered into the blood stream by intravenous injection.

The peptide type peripheral vasodilator substance of this invention is obtained by a method consisting of the steps (a)+(b), the step (a) being that in which at least one of either the skeletal muscles or viscera of an animal of the family Otariidae is decomposed and the step (b) being that in which the resulting decomposition liquid is extracted with a water-containing organic solvent, the water-containing organic solvent-soluble portion being collected. Alternatively, the foregoing substance is obtained by a method consisting of the combination of steps (a) and (b'), the step (b') being that in which said decomposition liquid is salted out and the precipitate is collected. It goes without saying, that the steps (b) and (b') can be repeated.

The foregoing resulting water-containing organic solvent-soluble portion or the precipitate obtained by the salting out operation can be further purified in the invention method in its organic solvent solution form, and preferably in its aqueous solution form.

The foregoing method of this invention will be more fully described below.

The aforesaid decomposing step (a) can be (i) carried out in the presence of at least one of either a protease or an autolytic enzyme. This decomposing step can also be (ii) carried out in the presence of at least one of either a hydrolytic acid or alkali substance. From the standpoints of such as yield and medicinal properties of the resulting active substance and operations, the adoption of the decomposing method (i) in which enzymes are used is particularly an advantage.

In carrying out this decomposing step (a), first the skeletal muscles and viscera of the material animal should preferably be shredded and rubbed to ensure that these materials will be subjected fully equally to the decomposing action. In this case, it is an advantage from the operational standpoint to eliminate in advance the oils and fats by employment of either a mechanical means such as a compression and centrifuging or a hydrophobic organic solvent, say, hexane or ether. The material is rendered into a slurry state having fluidity by adding water in a suitable amount, if necessary, following which the material is submitted to the decomposing step (a).

When the decomposing is to be carried out by means of the enzymatic decomposition (i), a protease is utilized. However, it is possible to utilize instead of said protease or in conjunction therewith the autolytic action by means of an autolytic enzyme.

As the protease, those known can be used. The decomposition by means of these proteases can be conveniently carried out by suitably adjusting the enzymatic decomposition conditions such as the optimum pH, optimum decomposition temperature and time, depending upon the class of the protease.

As such a protease included are such as "Bioprase" (Nagase Co., Japan), "Pronase" (Kaken Kagaku Co., Japan) and "Prozyme" (Amano Seiyaku Co., Japan).

When as the protease is used, for example, "Pronase" AF, 160–500 units (P.U.K.),[1] or more, per gram of the material are added, and the digestion is carried out for several hours, say, 3 to 4 hours.

In carrying out the enzymatic decomposition, it is convenient to carry out the decomposition with the addition of toluene for preventing adverse effects due to troublesome microorganisms.

The presence of microorganisms which produce proteases is however not particularly objectionable. Hence, it is to be understood that the terminology "carrying out the decomposing step," as used herein, is not meant to exclude particularly the operation under conditions in which microorganisms possessing the ability of producing such proteases are cultivated.

When the optimum pH of said protease is close to that of the material flesh, it is used without adjustment, but if it is on the acid side, say 4.0, the pH of the material slurry is adjusted by adding a physiologically harmless weak acid such, for example, as acetic acid or citric acid.

Further, according to the invention method, the aforesaid decomposing step (a) can also be carried out by subjecting the material slurry to hydrolysis in the presence of at least one of either an acid or an alkali for hydrolytic use.

In this case, usually hydrochloric acid is added to a slurry of the material flesh or viscera or a mixture thereof in an amount such that the total hydrochloric acid concentration becomes 10–20%, and preferably 10.8%, the hydrolysis then being carried out for from about ten minutes to several hours, say, about one hour, with stirring while maintaining a temperature of 30–80° C., and particularly preferably ca. 70° C. After the decomposition, the digested liquid is neutralized by adding caustic soda, following which the precipitate is removed by centrifuging.

Barium hydroxide is added to a slurry of the material flesh or viscera or a mixture thereof such that the total concentration becomes 4 N. Then hydrolysis is carried out for from about ten minutes to several hours, say, one hour, at 30–70° C., and preferably 65° C., after which an equivalent of sulfuric acid is added to neutralize the barium hydroxide that was added followed by removal of the precipitate by means of centrifugation.

Besides hydrochloric acid, it is also possible to use phosphoric and sulfuric acids for this hydrolysis. Again, the alkalis which can be used for this hydrolysis include such as caustic soda, caustic potash and sodium carbonate.

The crude product containing predominantly the intended peripheral vasodilator substance is then obtained from the decomposition liquid, which has been obtained via the decomposing step (a), by either a step (b) of extracting sad organic solvent-soluble portion with a water-containing organic solvent or a salting out step (b'), the customary salting out operation by means of ammonium sulfate. In the case step (a) was carried out by the enzymatic decomposition process, then in carrying out the extraction step (b) the following procedure is followed. The decomposition liquid is boiled to inactivate the enzyme followed by filtering off the solid matter and, if necessary, removal of fat by addition of an organic solvent, say, hexane or ether. The remaining organic solvent and odorous substances are then removed from the decomposition liquid usually by means of steam distillation. The solution is then concentrated under reduced pressure at a temperature as low as possible, after which an organic solvent, say, ethanol, is added to the concentrated liquid, if necessary, with the addition of water, until the concentration of said ethanol in the liquid after addition of the solvent becomes 60–80% by weight. The liquid is then heated under reflux preferably at 80–90° C. to effect the full dissolution of the soluble portion in said organic solvent, following which filtration is carried out to collect the ethanol-soluble portion.

The terminology "extracting with a water-containing organic solvent," as used herein, indicates that water is present in the system during the extraction operation, and should not be construed as referring to only those instances in which the addition is made as an aqueous solution at the time of addition.

As such organic solvents to be used for the extraction, included besides ethanol are the lower aliphatic acid alcohols such as methanol and butanol, and the acetone type solvents such as dimethyl ketone.

---

[1] When a protease is caused to act or a 2% casein solution, a color is developed in the solution. P.U.K. is the reading of a photoelectric cell photometer obtained when this color is measured at 660 mµ. The P.U.K. of one gram of "Pronase" is 45,000.

When this extraction solvent solution is concentrated by evaporation and left standing in a dark cool place, normally a small amount of a precipitate is formed. Hence, in this case the precipitate is filtered off. The treatment of collecting the water-containing extraction solvent-soluble portion may be repeated. When the resulting extraction solvent solution is dried utilizing evaporation, vacuum and spray drying or other known drying techniques, an amorphous powder containing the intended peptide type peripheral vasodilator substance in high concentration is obtained.

When acetone is used as the extraction solvent, the acetone is added to the concentrate of the decomposition liquid from which the odor has been removed, until the concentration of the acetone in the liquid after addition of the solvent becomes 40–60% by weight, and usually 50±5% by weight, after which the solution is heated under reflux to effect the thorough dissolution of the soluble component.

Further, the separation of the aforesaid intended product can also be accomplished without employing such a technique of using an extraction solvent but by a step (b′) which accomplishes the separation by the salting out technique.

The salting out operation is carried out in the following manner. The decomposition liquid obtained by means of protease or acid or alkali is deodorized and concentrated. Ammonium sulfate is added to this concentrated liquid until it reaches saturation at the liquid temperature during the operation. The resulting precipitate is collected by centrifuging, following which water is added and the precipitate is dissolved therein and then usually by passing the solution through a column of cross-linking dextran the desalting and purification of the precipitate is carried out.

The intended product, which has been obtained by the hereinbefore described method consisting of steps (a) plus (b) or that consisting of steps (a) plus (b′) can be used in its as-obtained crude state as a peripheral vasodilator preparation to be administered orally or cutaneously and also as a blending agent or additive to be used with cosmetics, dentifrices, chewing gum, medicated wines and other beverages, wherein its pharmacological activity can be utilized. It is also however possible to add another purification step (c) to obtain a product of still higher purity.

The customary purifying procedures such, for example, as purification by means of ion exchange resins and purification by means of column chromatography can be employed for carrying out this purification step (c). The employment of the column chromatography technique is of particular advantage however when considered from the standpoints of the purity and yield of the product and operative advantages.

Next, the method of purification in which column chromatography is employed will be described.

The crude product is best purified in the form of an aqueous solution. For instance, in the case the extraction was by the step (b), the crude product which is obtained as an amorphous powder can be used by again dissolving it in a solvent, but normally the solvent solution resulting from the extraction operation, for example, an ethyl alcohol solution, is concentrated under reduced pressure to eliminate the alcohol as well as to concentrate the original solution to a volume $\frac{1}{100}$–$\frac{1}{50}$ of that of the original volume, following which the solution is passed through a column of cross-linking dextran and the biuret reaction positive portion is collected.

This treatment will be fully described. As the filler, it is preferred especially that cross-linking dextran be used. And further it is particularly preferred that this dextran is one whose cross-linking grade is as fine as possible. As commercial products, there are available, for example, "Sephadex" G–10, G–25 and G–50 (products of Sweden-Pharmacia Company; those with the smaller G-number being the finer). Cross-linking dextran is a water-insoluble white powder.

As the filler, those which can be used for gel filtration will do. For instance, it is also possible to use polyacrylamide gel, agar-agar gel, rubber powder, etc.; however, from the commercial standpoint, the use of cross-linking dextran is particularly recommended.

In carrying out this treatment, the upper end of a column packed with, say, "Sephadex" G–25 (fine) is filled with the previously described concentrated liquid, after which it is flowed down through the column using distilled water. An outflow rate of about 25–75 ml. per hour is suitable. When for instance, 5 ml. portions of the liquid are fractionated, first a yellowish-brown fraction is obtained at a point past the void volume of the column, followed by a fractional liquid colored light yellow from a point after that where Kd=0.9, the liquid then gradually becoming colorless. A biuret reagent is added to the several fractionated liquids and the optical density of the color developed is measured at a wavelength of 550 m$\mu$. At the same time the optical density [2] shown by the tyrosine residue at a wavelength of 270–280 m$\mu$ is also meaured.

When this is illustrated with reference to the accompanying drawing in FIG. 1 the optical density at the wavelength of 550 m$\mu$ is indicated on the vertical axis at the left, while the optical density at the wavelength of 270 m$\mu$ is indicated on the vertical axis at the right. On the other hand, the horizontal axis shows the volume of the liquid which has flowed out, the numerals being the test tube number of fraction collector, each of which has a capacity of 5 ml. The curve shown by means of the solid line is the optical density curve of the instance when the specimen was measured at the wavelength of 550 m$\mu$, while that shown by means of the dotted line is the optical density of the instance when the specimen was measured at the wavelength of 270 m$\mu$. The ranges in which test tubes Nos. 1–12, 13–28, 29–35, 36–44 and 45–50 fall are considered to be respectively the first, second, third, fourth and fifth fractional portions.

The optical density of both curves appear intensely in the second and third fractional portions, the indication of biuret reaction positive being especially pronounced. The first fractional portion consists almost all of the outflowing distilled water, while the second fractional portion is where the biuret reaction appears intensely, but it does not possess the odor that is peculiar to the original liquid. The third fractional portion is where the optical density at 270–280 m$\mu$ appears intensely and is the portion where components having an odor peculiar to that similar to that of pyroracemic acid congregate. The fourth fractional portion is practically odorless as well as colorless. When the physiological activity of the several fractional portions are investigated, they are as follows: A strong capillary vasodilator activity was noted in the case of the second fractional portion. Again, when the second fraction portion was injected into animals, a 10–15 mm. Hg lowering of the blood pressure was noted, whereas a blood pressure lowering activity could not be confirmed in the case of the portions other than the second and third fractional portions. From the fact that the components of this second fractional portion shows an intense biuret reaction, it is presumed that it contains polypeptides of tripeptide and above. Further, when components of this portion are examined with the amino acid automatic analyzer, the free amino acids are observed in very minute amounts, but there are seen 10–12, or more, unknown peaks which develop color by reacting with ninhydrine. Next, when this portion is subjected to hydrolysis and again examined with the amino acid automatic analyzer, these unknown peaks disappear and prac-

---

[2] The logarithm of the reciprocal of the light absorption rate, log $(I_o/I)$ where $I_o$ is the intensity of light before it enters an object and $I$ is the intensity of the light after having been absorbed.

tically all classes of amino acids appear. From these results, it is presumed that there is present togther in the second fractional portion a number of classes of heptides.

While the second and third fractional portions can be utilized, the collection of the effective component as an aqueous solution can be carried out especially favorably by collecting the contents of the test tubes up to the fifth tube to the right along the horizontal axis in the figure starting with the tube located at the point where the biuret reaction is of maximum intensity.

If the conditions relative to the class of filler, volume, rate of flow and volume of the specimen to be fractionated are constant, the second fractional portion alone can be collected readily and promptly without carrying out the examination by means of the biuret reaction on each occasion. For example, when a column is packed with "Sephadex" and then filled with the specimen, 12 5-ml. test tubes are required to attain a void volume. Hence, 60 ml. of the flowing liquid are received into a graduate and eliminated (the first fractional portion). Next, 75 ml. of the outflowing liquid are collected with the graduate, and this is the second fractional portion.

For preparing the second fractional portion in still greater quantities and rapidly, this can be accomplished by suitably varying the size of the column.

The second fractional portion can be concentrated and then be made into an alcohol solution by adding, say, an equivalent of alcohol. Either the alcohol solution of the concentrate of the fractional portion can be dried under reduced pressure, freeze-dried or spray-dried and made into a powder, or drying can also be carried out in the as-obtained aqueous solution state without adding the alcohol. It is also possible to use acetone.

The term "biuret reaction positive" in the case of the invention peripheral vasodilator substance is defined as being the case when the condition determined in the following manner is satisfied. A column is packed with cross-linking dextran ("Sephadex" G-25, fine) which has been thoroughly swelled with 250 cc. of water. The upper end of this column is filled with 20 cc. of said vasodilator substance in solution in 5 cc. of water, after which this is eluted with distilled water flowing at the rate of 60 ml. per hour. The aliquot liquid consisting of 5 cc. portions of the effluent collected with a fraction collector is diluted fivefold with distilled water, to which is added an equal quantity of a biuret reagent (e.g. 5 cc. of the biuret reagent to 5 cc. of the diluted liquid). The color-developed liquid is then allowed to stand 1–2 hours at room temperature, after which its optical density is measured with a photoelectric cell photometer, using as the blank distilled water to which the biuret reagent has been added in a quantity equal to that added hereinabove. When the optical density is a value of at least 0.1 at 550 m$\mu$, this is referred to as being biuret reaction positive. An optical density of at least 0.2 is to be preferred.

Further, other purification means can also be employed in the invention method. In the application of these purification means, it is also possible to employ a combination of a plurality thereof.

As one of the other purification means, there is a method wherein an ion exchange resin is used. In this case, the aqueous solution from which has been evaporated under reduced pressure the solvent of the water-containing extraction solvent solution, or an aqueous solution of the crude product which has once been made into a powder is eluted with an acid buffer using a column of an ion exchange resin such, for example, as "Dowex" 50 or "Amberline" 50, following which the effluent is collected and concentrated to a given concentration. When the precipitate has been obtained by the salting out technique, this can be similarly practiced after dissolving the precipitate in water.

The processes of the manufacture of the polypeptide type vasodilatational substance of this invention will hereinafter be explained by examples.

EXAMPLE 1

Seven hundred grams of dressed meat of *Callorhinus ursinus*, 210 g. of its liver, 42 g. of its heart and 48 g. of its kidney were minced by a meat-grinder. One thousand milliliters of water and about 8 g. of 30,000 P.U.N. proteolytic enzyme (Nagases Bromelain) were added to the resulting starting material (1 kg.). While stirring at 45° C., the mixture was digested for 3 hours. Then, it was boiled for 10 minutes at 90° C. to deactivate the enzyme. The resulting digested slurry was centrifugalized for 1 hour at 5,000 r.p.m. to remove the undigested slurry residue, and 1,500 ml. of a supernatant liquid was obtained. To the supernatant liquid was added 1,500 ml. of hexane, and the mixture was stirred, separated into fractions and filtered. This procedure was repeated three times, and the offensive smell and the fat content were completely eliminated. Hexane was removed by carrying out vapor-distillation for 20 minutes. The residual liquor was concentrated on a water bath to form 300 g. of a slurry concentrate with a water content of 58%. Three hundred grams of 99.5% ethyl alcohol was added to the resulting product, and the mixture was refluxed for 15 minutes at 70°. The obtained alcohol solution was concentrated by evaporation to remove the alcohol, freezed at −20° C., and dried at 30° C. under reduced pressure. There was obtained 44 g. of powder containing an effective ingredient.

EXAMPLE 2

Seven hundred grams of dressed meat of *Callorhinus ursinus*, 210 g. of its liver, 42 g. of its heart and 48 g. of its kidney were minced. One thousand milliliters of water and 8 g. of 30,000 P.U.N. proteolytic enzyme (Nagase Bromelain) were added to the starting material (1 kg.), and decomposition was effected for 3 hours at 45° C. The mixture was then boiled for 10 minutes at 90° C. to deactivate the enzyme, and centrifugalized for 1 hour at 5,000 r.p.m. to remove the undigested residue. There was obtained 1,500 ml. of a supernatant liquid. To the supernatant liquid was added 1,500 ml. of hexane, and the mixture was stirred and separated into fractions. This procedure was repeated three times and the bad smell and the fat content were removed. Then, the hexane was removed by carrying out vapor-distillation for 20 minutes. The residual liquor was concentrated at 100° C. to a water content of 58%. Three hundred grams of 99.5% ethyl alcohol was added to 300 g. of the thus obtained concentrate, and the mixture was refluxed for 15 minutes at 70° C. Twenty milliliters of the resulting solution was distilled under reduced pressure to remove the alcohol, and concentrated to about 5 ml.

A column with an inner diameter of 2.5 cm. and a height of 45 cm. was packed with Sephadex G-25 (fine) which had been swelled for several hours, and filled at its top with the above-mentioned concentrated liquor. Distilled water and flowed down through the column at the rate of 65 ml. per hour, and the obtained liquor was collected in test tubes of a fraction collector in an amount of 5 ml. for each. One milliliter of the liquor was withdrawn from each of the test tubes. On addition of 4 ml. of a biuret reagent, the degree of extinction was determined at 545 m$\mu$. Five test tubes which had the greatest intensity of biuret reaction were chosen from those test tubes which exhibited a positive biuret reaction. The contents of theses test tubes were collected, which totalled 75 ml.

The resulting liquor contains nitrogen in an amount of 2.5 mg. per 1 ml. as a peptide type nitrogen. It is yellowish brown and has no peculiar offense smell. Internal administration of the liquor as it is revealed no side-effect.

EXAMPLE 3

One hundred grams of minced muscle of *Callorhinus ursinus*, 100 ml. of distilled water and 100 ml. of 32.5% hydrochloric acid (total hydrochloric acid concentration being 10.8%) were put into 1-liter eggplant type flask, and maintained at 70° C. on a water bath with good stirring. Then, the mixture was subjected to hydrolysis for 1 hour. Saturated caustic soda solution was added gradually to the digested liquor, and made roughly neutral while testing by the use of a pH test paper. The mixture was centrifugalized for 1 hour at 5,000 r.p.m. to remove the residue. There was obtained 320 ml. of the supernatant liquid. To the supernatant liquid was added 300 ml. of hexane, and the mixture was stirred, separated into fractions and filtered. This procedure was repeated three times, and the offensive smell and the fat content were completely eliminated. Hexane was removed by carrying out vapor distillation for 20 minutes. The residual liquor was concentrated on a water bath at 100° C. and there was obtained 60 g. of a slurry concentrate with a water content of 58%. Eighty grams of 99.5% ethyl alcohol was added thereto, and the mixture was refluxed for 15 minutes at 80° C. The alcohol solution (78 g.) was concentrated by evaporation to remove the alcohol, and dried under reduced pressure at 30° C. to give 6 g. of powder.

EXAMPLE 4

One hundred grams of miced meat of *Callorhinus ursinus*, 100 ml. of distilled water, and barium hydroxide (4 N to the total amount) were put into 1-liter egg-plant type flask. While stirring, the contents were hydrolyzed for about 1 hour at a temperature in the range of 60 to 70° C. After cooling the contents to room temperature, sulfuric acid (about 10–12 N) equivalent to the barium hydroxide was added, and the precipitate was removed by centrifugalization for 1 hour at 500 r.p.m. There was obtained 350 ml. of a supernatant liquid. Three hundred and fifty milliliters of hexane was added thereto, and the mixture was stirred, separated into fractions and filtered. This procedure was repeated three times, and the offensive smell and the fat content were completely removed. Hexane was removed by vapor-distillation carried out for 20 minutes. The residual liquor was concentrated on a water bath at 100° C., and there was obtained 60 g. of a slurry concentrate with a water content of 60%. Sixty grams of 99.5% ethyl alcohol was added thereto and refluxed for 15 minutes at 70° C. to make an alcohol solution. With the use of twenty milliliters of this alcohol solution, the purification was carried out in accordance with the procedures of Example 2.

EXAMPLE 5

The offensive smell and the fat content of an obtained enzyme decomposed liquor or hydrolyzed liquor were eliminated in the same manner as in Examples 1 to 4. Three hundred milliliters of the so-treated liquor was concentrated on a water bath at 100° C. to a water content of 60%. To the obtained slurry concentrate (50 g.) was added 60 ml. of 1st grade acetone reagent, and the mixture was refluxed for 15 minutes at 60° C. There was obtained 80 ml. of an acetone solution. Twenty milliliters of the so-obtained solution was collected and in accordance with the procedures of Example 2, was purified through a column of cross-linked dextran. There was obtained 300 ml. of a solution having 2.5 mg. of peptide type nitrogen per 1 ml. from the entire quantity of the above-mentioned decomposed liquor.

EXAMPLE 6

The offense smell and the fat content of an obtained enzyme decomposed liquor or hydrolyzed liquor were eliminated in the same manner as in Examples 1 to 4. To 100 ml. of the so-treated liquor was added 64 g. of ammonium sulfate, and the mixture was salted out. The precipitate was collected by centrifugalization and made into its aqueous solution on addition of water.

A column with an inner diameter of 2.5 cm. and a height of 45 cm. was packed with Sephadex G-25 (fine; cross-linked dextran gel made by Pharmacia Corp.) which had been swelled for several hours, and filled at its top with 5 ml. of said aqueous solution. Distilled water was flowed down at the rate of 65 ml. per hour. The obtained liquor was collected in test tubes of a fraction collector in an amount of 5 ml. for each. One milliliter of the liquid was taken out from each of the test tubes, and on addition of 4 ml. of a biuret reagent, its degree of extinction at 545 m$\mu$ was determined. The contents of the test tubes which exhibited strong positive biuret reaction were collected, which totalled 50 ml. This resulting solution is yellowish brown with no bad smell and contains 1.5 mg. of nitrogen per 1 ml. as peptide type nitrogen. Gel-filtration was carried out sequentially with respect to all the salted out and dissolved products. By collecting the entire effective fractions, there were obtained 2.0 g. of powdery caropeptide.

EXAMPLE 7

Soluble saccharin (0.1 part) and 1 part of perfume were dissolved in a small amount of alcohol, and mixed with 0.1 part of an ethanol solution of caropeptide contaning 100 mg. of the substance obtained in Example 2 per 1 ml. Separately, 95 parts of calcium secondary phosphate was well mixed with 1.5 parts of sodiumlauryl sulfate. The said mixed solution was blown against a part of this mixture, and well admixed with the remaining powder to give powder dentifrice.

EXAMPLE 8

Ten parts of glycerin, 1.5 parts of sodiumlauryl sulfate, 0.15 part of soluble saccharin and a proper amount of a coloring matter were dissolved in 15 parts of water. The solution was sprayed on a small amount of calcium secondary phosphate together wtih 1 part of perfume and 0.05 part of caropeptide aqueous solution containing 100 mg. of the substance obtained in Example 2 per 1 ml., and well admixed. The mixture was then mixed with 70 parts of the remaining calcium secondary phosphate to make half kneaded dentifrice.

EXAMPLE 9

Twenty parts of water was well mixed with 30 parts of glycerin. One part of methyl cellulose, 0.5 part of soluble saccharin and 1.5 parts of sodiumlauryl sulfate were dissolved in this mixture. With the addition of 45 parts of calcium secondary phosphate, it was well kneaded. On addition of 1.0 part of perfume, 0.05 part of 10% of the substance obtained in Example 2, and 1.5 parts of fluid paraffin, the mixture was well kneaded to form a dental cream.

EXAMPLE 10

Twelve kilograms of sugar were dissolved in 15 liters of water, and on addition of 1.2 liters of ⅕ concentrated fruit juice and 18 g. of clouder, the mixture was well stirred. Separately, 250 g. of citric acid, 18 g. of a preserving agent, 1 g. of closing matter for foodstuff, 36 g. of vitamin C and 5 g. of common salt were dissolved in a small amount of water. The resulting solution was mixed and kneaded with the said sugar solution. Finally, 0.1 g. of a 10% aqueous solution of the substance obtained in Example 2 and a small amount of perfume were added and the volume of the entire solution was adjusted to 18 liters by the addition of water. The resulting solution was homogeneously admixed to make a concentrated fruit juice. When it is offered for drinking, it is diluted to about 5 times its volume.

EXAMPLE 11

A 10% aqueous solution of the substance obtained in Example 2 (0.05 part), 40 parts of sugar, 25 parts of grape sugar and 1 part of perfume were homogeneously mixed and stirred. The resulting mixture was homogeneously admixed with a chewing gum base consisting of 12 parts of vinyl acetate resin, 7 part of chicle gum, 2 parts of butyl phthalyl butyl glycolate, 1 part of carnauba wax and 2 parts of calcium carbonate, and rolled to make a chewing gum.

EXAMPLE 12

A 10% aqueous solution of the substance obtained in Example 2 (0.05 part), 40 parts of sugar, 25 parts of grape sugar, and 1 part of perfume were homogeneously mixed. This resulting mixture was kneaded with a chewing gum base consisting of 15 parts of natural chicle, 10 parts of vinyl acetate resin, 2 parts of calcium carbonate, 2 parts of butyl phthalyl butyl glycolate and 0.5 part of aliphatic ester of sucrose, and rolled to make a chewing gum.

EXAMPLE 13

A solution of 50 parts of water and 17 parts of 90% alcohol was mixed with a solution of 15 parts of water, 3.5 parts of grape sugar, and 0.4 part of 4% millet jelly. To this mixture was added a solution in 5 parts of water of 0.02 part of sodium glutamate, 0.09 part of succinic acid, 0.09 part of 75% lactic acid, 0.02 part of acidic potassium phosphate, 0.006 part of acidic calcium phosphate, 0.02 part of common salt, 0.02 part of alanine, and 0.02 part of glycine. On subsequent addition of 5 parts of perfume and 0.1 part of a 10% aqueous solution of the substance obtained in Example 2, the mixture was thoroughly stirred and mixed to make a medicinal wine.

We claim:
1. A method of preparing a peptide type peripheral vasodilator substance which comprises:
 (a) subjecting at least one member selected from the group consisting of the skeletal muscles and viscera of an animal of the family Otariidae to hydrolysis in the presence of at least one substance selected from the group consisting of proteases, autolytic enzymes, acids selected from hydrochloric acid, sulfuric acid and phosphoric acid and alkali selected from barium hydroxide, sodium hydroxide, potassium hydroxide and sodium carbonate; and
 (b) extracting the liquor resulting from (a) with a water-containing organic solvent selected from lower aliphatic alcohols and acetone and thereafter, separating and collecting the water-containing solvent-soluble portion.
2. A method of preparing a peptide type peripheral vasodilator substance which comprises:
 (a) subjecting at least one member selected from the group consisting of the skeletal muscles and viscera of an animal of the family Otariidae to hydrolysis in the presence of at least one substance selected from the group consisting of proteases, autolytic enzymes, acids selected from hydrochloric acid, sulfuric acid and phosphoric acid and alkali selected from barium hydroxide, sodium hydroxide, potassium hydroxide and sodium carbonate; and
 (b) salting out the liquor resulting from (a) by the use of ammonium sulfate and thereafter collecting the preparation so formed.
3. The method of claim 1 wherein said water-containing organic solvent-soluble portion is further purified by step (c) in a form selected from an aqueous solution and an organic solvent solution of the same by a means selected from column chromatography and treatment with an ion exchange resin.
4. The method of claim 3 wherein said purification is effected by means of column chromatography which employs a cross-linking dextran as the filler.
5. The method of claim 3 wherein said purification is effected by a treatment consisting of adsorbing the impurities with an ion exchange resin.
6. The method of claim 2 wherein said precipitate is further purified by step (c) in a form selected from an aqueous solution and an organic solvent solution of the same by a means selected from column chromatography and treatment with an ion exchange resin.
7. The method of claim 6 wherein said purification is effected by means of column chromatography which employs a cross-linking dextran as the filler.
8. The method of claim 6 wherein said purification is effected by a treatment consisting of adsorbing the impurities with an ion exchange resin.
9. The method of claim 1 wherein said hydrolysis step (a) is effected in the presence of at least one substance selected from the group consisting of proteases and autolytic enzymes and said extracting step (b) is effected with the addition of a lower aliphatic alcohol in an amount such that the concentration thereof in the liquor resulting from step (a) after the addition thereof becomes 60–80% by weight.
10. The method of claim 1 wherein said organic solvent is acetone, said acetone being added such that its concentration in the liquor resulting from (a) after the addition thereof becomes 40–60% by weight.
11. A peptide prepared by the process of claim 1.
12. A peptide prepared by the process of claim 2.

References Cited

Chem. Abstracts, vol. 49, 1955, 1113g, Takagi.

HAROLD D. ANDERSON, Primary Examiner
H. SCHAIN, Assistant Examiner

U.S. Cl. X.R.
99—18, 105; 195—2, 4, 29; 424—48, 49, 177